US 8,864,346 B2

(12) United States Patent
Chinniah et al.

(10) Patent No.: US 8,864,346 B2
(45) Date of Patent: Oct. 21, 2014

(54) LENS-REFLECTOR COMBINATION FOR BATWING LIGHT DISTRIBUTION

(71) Applicant: GE Lighting Solutions, LLC, East Cleveland, OH (US)

(72) Inventors: Jeyachandrabose Chinniah, Willoughby Hills, OH (US); Benjamin Lee Yoder, Cleveland Heights, OH (US); Gary Robert Allen, Chesterland, OH (US)

(73) Assignee: GE Lighting Solutions, LLC, East Cleveland, OH (US)

( * ) Notice: Subject to any disclaimer, the term of this patent is extended or adjusted under 35 U.S.C. 154(b) by 31 days.

(21) Appl. No.: 13/709,403

(22) Filed: Dec. 10, 2012

(65) Prior Publication Data

US 2014/0160766 A1    Jun. 12, 2014

(51) Int. Cl.
| | |
|---|---|
| F21V 13/04 | (2006.01) |
| G02B 19/00 | (2006.01) |
| F21V 7/00 | (2006.01) |
| F21V 5/04 | (2006.01) |

(52) U.S. Cl.
CPC ............ *F21V 13/04* (2013.01); *G02B 19/0061* (2013.01); *F21V 7/0091* (2013.01); *G02B 19/0028* (2013.01); *F21V 5/04* (2013.01)
USPC ........................ 362/311.02; 362/326; 362/327

(58) Field of Classification Search
USPC .............................. 362/311.02, 326, 327, 329
See application file for complete search history.

(56) References Cited

U.S. PATENT DOCUMENTS

| 4,096,555 | A | 6/1978 | Lasker | |
|---|---|---|---|---|
| 7,635,198 | B2 | 12/2009 | Mayfield, III et al. | |
| 7,753,561 | B2 * | 7/2010 | Chaves et al. | 362/308 |
| 7,841,738 | B2 | 11/2010 | Engel | |
| 8,042,965 | B2 * | 10/2011 | Peng et al. | 362/97.3 |
| 8,382,328 | B2 * | 2/2013 | Hsu | 362/277 |
| 8,506,112 | B1 * | 8/2013 | Dau et al. | 362/217.05 |
| 2009/0225543 | A1 | 9/2009 | Jacobson et al. | |
| 2010/0165637 | A1 | 7/2010 | Premysler | |

(Continued)

FOREIGN PATENT DOCUMENTS

WO    2008102287 A1    2/2008

OTHER PUBLICATIONS

PCT Search Report and Written Opinion dated Jan. 24, 2014 from corresponding Application No. PCT/US2013/070887.

*Primary Examiner* — Laura Tso
(74) *Attorney, Agent, or Firm* — Global Patent Operation; Peter T. DiMauro

(57) ABSTRACT

The present subject matter is directed to a system and method for producing a batwing light distribution. A lens is illuminated with a light source, preferably an LED, and the lens is configured to internally reflect a portion of the illuminating light back in a direction generally opposite to the initial illumination direction. Another portion of the light from the light source may pass through other lens surfaces but may also be reflected back past the light source with a reflector positioned on the other side of the lens from the light source. The light source may be mounted on a frame so as to obscure light therefrom from view.

18 Claims, 4 Drawing Sheets

(56) References Cited

U.S. PATENT DOCUMENTS

| | | |
|---|---|---|
| 2011/0019408 A1 | 1/2011 | Jang |
| 2011/0141729 A1 | 6/2011 | Yang et al. |
| 2011/0141734 A1 | 6/2011 | Li et al. |
| 2011/0320024 A1 | 12/2011 | Lin et al. |
| 2012/0051066 A1 | 3/2012 | Koo et al. |
| 2012/0113621 A1 | 5/2012 | Lee et al. |
| 2012/0120666 A1 | 5/2012 | Moeller |

* cited by examiner

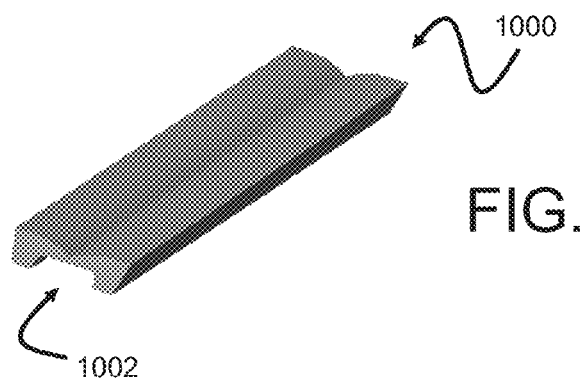
FIG. 10
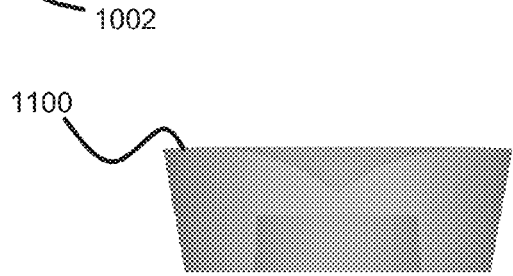 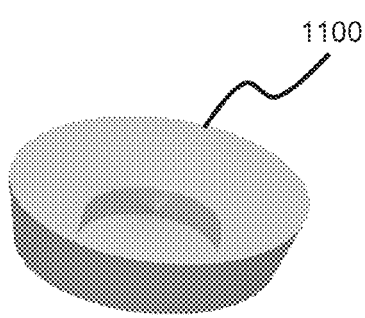
FIG. 11A   FIG. 11B
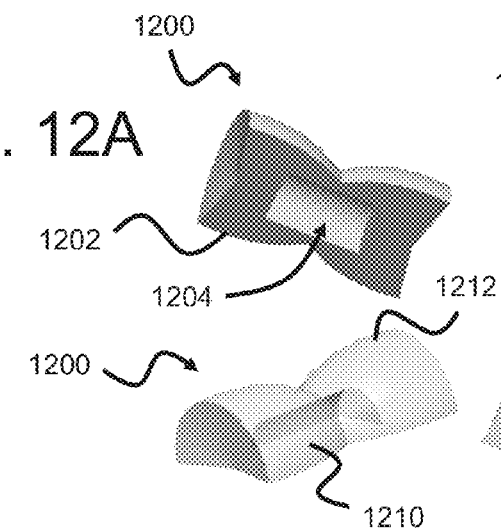 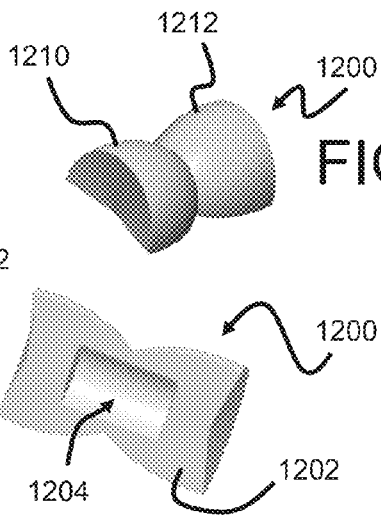
FIG. 12A   FIG. 12C
FIG. 12B   FIG. 12D

LENS-REFLECTOR COMBINATION FOR BATWING LIGHT DISTRIBUTION

BACKGROUND

The present subject matter relates to lighting. More particularly, the present subject matter relates to LED (light emitting diode) based lamps and associated lens and reflector assemblies and methods.

Currently batwing light distribution may be preferred for illuminating rooms, streets and commercial stores to create uniform intensity over the illuminated area. Several prior art patents use LED sources with lens and/or reflector combinations. Representative examples include US Published Patent Applications US 2009/0225543, US 2010/0165637, US 2011/0141729, and US 2011/0141734.

An issue has arisen, however, in that in many of these cases, lit LEDs are visible to the observer since the LEDs are facing the light direction and sending light rays directly through the lens.

In view of these known issues, it would be advantageous, therefore, to provide a lens and reflector configuration that will allow for uniform illumination operations using LED lamps while avoiding direct observation of the LED lamps.

BRIEF DESCRIPTION OF THE INVENTION

Aspects and advantages of the invention will be set forth in part in the following description, or may be obvious from the description, or may be learned through practice of the invention.

The present subject matter relates to a LED lamp, lens, and reflector configuration wherein LEDs are arranged to face in the opposite direction to the light direction and, in some embodiments, are completely hidden by, for example, a supporting frame or heat sink. A portion of the light from an LED source is sent by total internal reflection from a curved surface and by refraction through a second surface of the lens to create a batwing portion of the light distribution. The remainder of the light from the LED source is sent through the lens to a highly reflective reflector which diffuses the light towards the center portion of the batwing distribution.

In a first exemplary embodiment of the present subject matter a light distribution system is provided comprising a lens having a first and second surface. An LED light source is configured such that light from the LED is directed toward the first surface. Light directed toward the first surface passes through the lens and is at least partially reflected back from the second surface to produce a batwing light distribution in a light direction generally opposite to the initial direction of light from the LED. Depending on the construction of the lens, it is possible to obtain total internal reflection from the second surface thereby avoid light leaks (stray light) through the second surface.

In other embodiments of the present subject matter, a reflector is positioned opposite the second surface of the lens (e.g., on the other side of the second surface, away from the LED light source), so that at least a portion of the light passing through the lens and emerging from the second surface and a third surface corresponding to side surfaces of the lens is reflected back by the reflector to provide fill light in a central area of the batwing light distribution produced by the lens.

In selected other embodiments of the present subject matter the second surface is bifurcated along a central line into two symmetric portions thereby producing a symmetric batwing light distribution. In certain of such embodiments, the second surface is bifurcated along a central line into two asymmetric portions thereby producing an asymmetric batwing light distribution. In some embodiments each of the two asymmetric portions has an angle defined from a central axis to the point of peak intensity wherein the differences between the angles is in the range of about 5° and 30° and in particular embodiments have peak differences of about 10°. In other embodiments the surface is bifurcated along a central line into two asymmetric portions so that light flux from the LED is directed to a first portion such that the relative ratio of amount of light between the first portion and the second portion is approximately in a range from about 20:80 to 40:60. In particular such embodiments the ratio is about 30:70.

In still further embodiments of the present subject matter, the lens may be axially symmetric or linearly elongated. In selected embodiments of the present subject matter the first surface of the lens is generally flat and the second surface is bifurcated. In certain such embodiments, the bifurcated surfaces are symmetrical while in other such embodiments, the bifurcated surfaces are asymmetrical. In particular embodiments the first surface may include a recessed area for at least partially receiving the LED light source.

The present subject matter also relates to a method for producing a batwing distribution of light. According to such method, a source of light illuminates a lens having a first and second surfaces in an initial light direction such that a portion of the illuminating light strikes the first surface and is internally reflected within the lens from the second surface in a direction generally opposite to the initial light direction of the source of light. In some embodiments, the method also provides for obscuring the source of light from direct view in a direction toward the first surface.

In other embodiments, the method further provides for reflecting a portion of the illuminating light passing through the second surface and a third surface corresponding to side surfaces between the first and second surfaces in a direction generally opposite to the initial light direction. For example, the side surfaces of the lens may connect the first and second surfaces; thus, in such manner, the side surfaces may be between the first and second surface. In certain such embodiments the second surface is bifurcated along a central line into two symmetric portions thereby producing a symmetric batwing light distribution. In other such embodiments the second surface is bifurcated along a central line into two asymmetric portions thereby producing an asymmetric batwing light distribution. In particular embodiments the method provides that the two asymmetric portions have peak differences between about 5° and 30° from a point along a central axis while in other embodiments the method provides that the two asymmetric portions distribute light between the first portion and the second portion in a ratio range from about 20:80 to 40:60.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which:

FIG. 10 is an illustration of an extruded lens embodiment of the present subject matter;

FIGS. 11A and 11B, respectively, illustrate phantom cross section and isometric views of an axial symmetric lens in accordance with a further embodiment of the present subject matter; and FIGS. 12A, 12B, 12C, and 12D illustrated rotated lens embodiments of the present subject matter.

Figure 1:
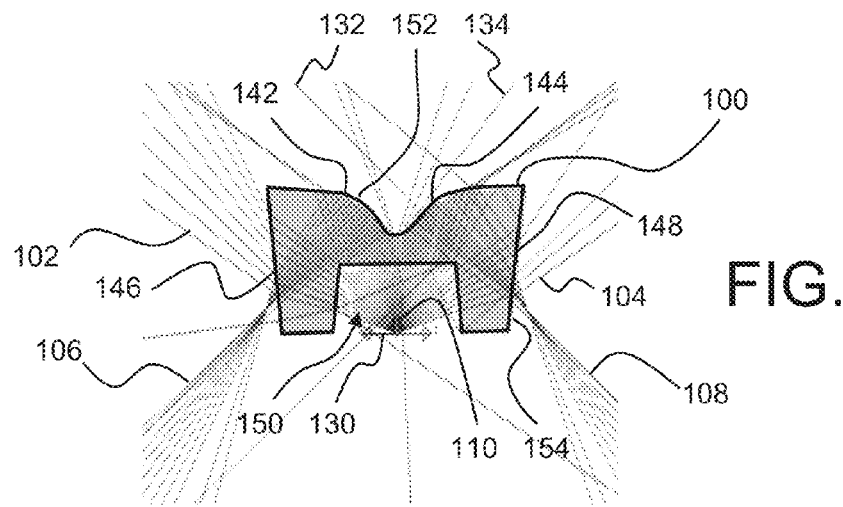
FIG. 1 is an illustration of light from an LED through a first exemplary lens in accordance with the present subject matter.

Repeat use of reference characters throughout the present specification and appended drawings is intended to represent same or analogous features or elements of the invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates representative light paths 102, 104, 106, 108 from LED 110 through a first exemplary lens 100 in accordance with the present subject matter. In accordance with this first embodiment of the present subject matter, LED 110 is mounted on a support frame 130 such that light produced by LED 110 is directed toward lens 100 and is substantially blocked (obscured) by support frame 130. In this manner, light from LED 110 is desirably not directly seen by an observer, but rather light produced by LED 110 is diffused (refracted and reflected) through lens 100.

In accordance with the present subject matter, lens 100, as well as other lenses described herein, may be formed of a rigid optical polymer, for example, polycarbonate, polymethylmethacrylates, and other known material, via an extrusion process. In general, other embodiments of the lens could be formed from other transparent polymers, silicones, glasses, or ceramics via other processes including machining and polishing, injection molding, and casting. More generally lenses employed in the implementation of the present subject matter may be constructed in accordance with known and accepted construction techniques from known materials or by techniques yet to be developed using existing or newly discovered materials.

As can be seen in FIG. 1, light from LED 110 traveling in an initial direction may enter a first surface 150 of lens 100 to emerge as light paths 102, 104 from generally flat side surfaces 146, 148 of lens 100. Light paths 102, 104 emerge generally in the initial direction of light from LED 110. Others of the light paths, for example, paths 106, 108 are internally reflected from a second surface 152 corresponding to curved surfaces 142, 144 of the lens 100 and emerge through a third surface 154 corresponding to side surfaces 146, 148, respectively of lens 100. Still other of the light paths, for example, stray light paths 132, 134, are partially refracted within lens 100 and emerge from the curved surfaces 142, 144 generally in the initial direction of the light from LED 110. In this manner, lens 100 is configured to provide a batwing light distribution in a light direction generally opposite to the initial direction of light from LED 110 while support frame 130 not only supports LED 110 but also desirably blocks (obscures) direct view of LED 110 by observers. It should be appreciated that LED 110 may, in fact correspond to an array or group of LEDs, e.g., a linear series of LEDs; while lens 110 may correspond to a linear device, for example, as illustrated in FIG. 10, to be described more fully later. It should be understood that any reference to LED or "an LED" may suitably also refer to a plurality of LEDs, or may only refer to a single LED.

Figure 2:
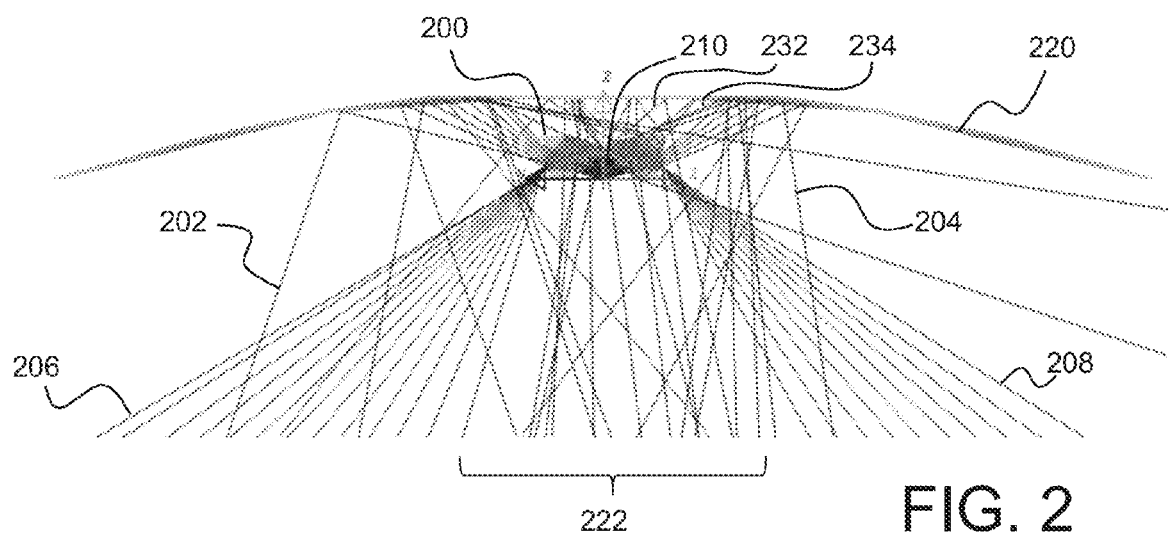
FIG. 2 is an illustration of light from an LED through a first exemplary lens and reflector in accordance with the present subject matter.

FIG. 2 is an illustration of light paths from LED 210 through first exemplary lens 200 and from reflector 220 in accordance with the present subject matter. As previously illustrated in FIG. 1, support frame 130 generally blocks (obscures) light in the direction of an observer which, for purposes of concealing LED 210, is beneficial but results in a less uniform distribution of light. With reflector 220 placed on the opposite side of lens 200 from LED 210, certain of the light paths, for example, paths 202, 204 that previously, per FIG. 1, followed a path away from an observer now follow a path from LED 210 through lens 200 and toward reflector 220 where they are reflected so as to be redirected into a direction generally opposite from their initial path from LED 210. It will also be appreciated that light paths 232, 234 illustrated in FIG. 1 as stray paths 132, 134, will also be redirected into a direction generally opposite from their initial path from LED 210. In this manner the reflected light paths 202, 204, 232, 234 are able, with similar such light paths, to "fill in" the otherwise less illuminated area 222 resulting, in part, from light blocked by the support frame (not separately number here) from LED 210. Others of the light paths, for example, paths 206, 208 are internally reflected from a surface of the lens 200.

Figure 3:
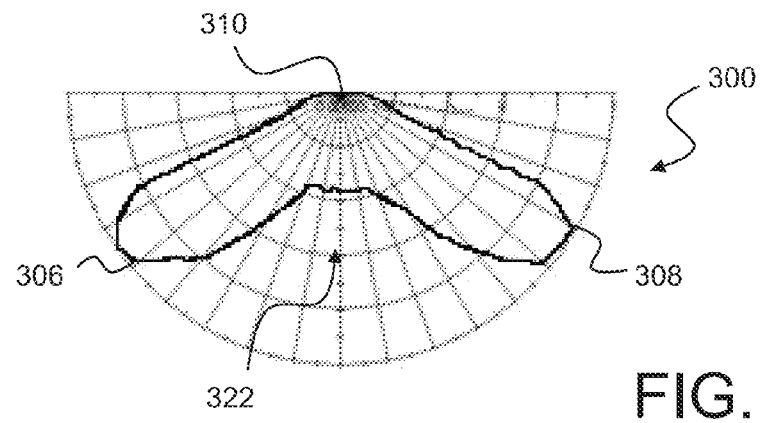
FIG. 3 is a graphical representation of a typical light distribution from the lens-reflector and a support frame combination in accordance with a first embodiment of the present subject matter.

FIG. 3 is a graphical representation 300 of an exemplary light distribution pattern from an exemplary lens-reflector and a support frame combination as illustrated in FIG. 2 in accordance with a first embodiment of the present subject matter. As seen in FIG. 3, light distribution is represented in cross-sectional view as a batwing distribution with an origin point 310 indicative of light from the area of LED 110 and support 130 and with major lobes 306, 308 indicating illumination intensity along the radial direction of the graph but also includes an area of illumination 322 that, without reflector 220 (FIG. 2) present, would have been provided with significantly less illumination due to the initial light direction from the LED source and blockage from the LED support structure. By redirecting this light that would otherwise continue to follow its initial path, the reflector also increases the optical efficiency of the overall system.

Figure 4:
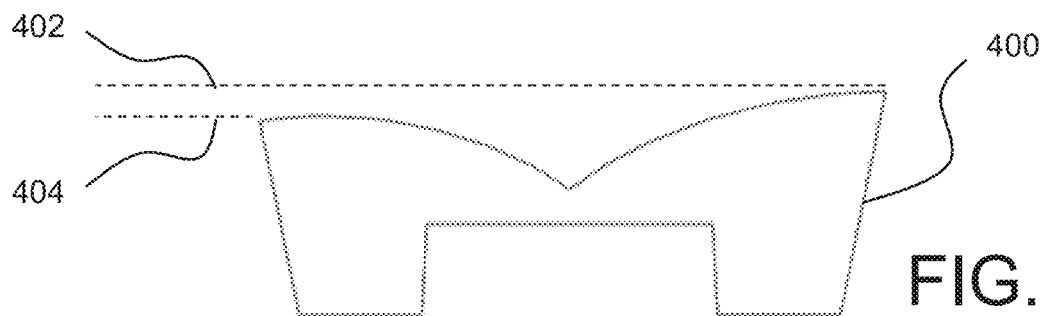
FIG. 4 is an illustration of a first variation of an asymmetric lens in accordance with the present subject matter.
Figure 5:
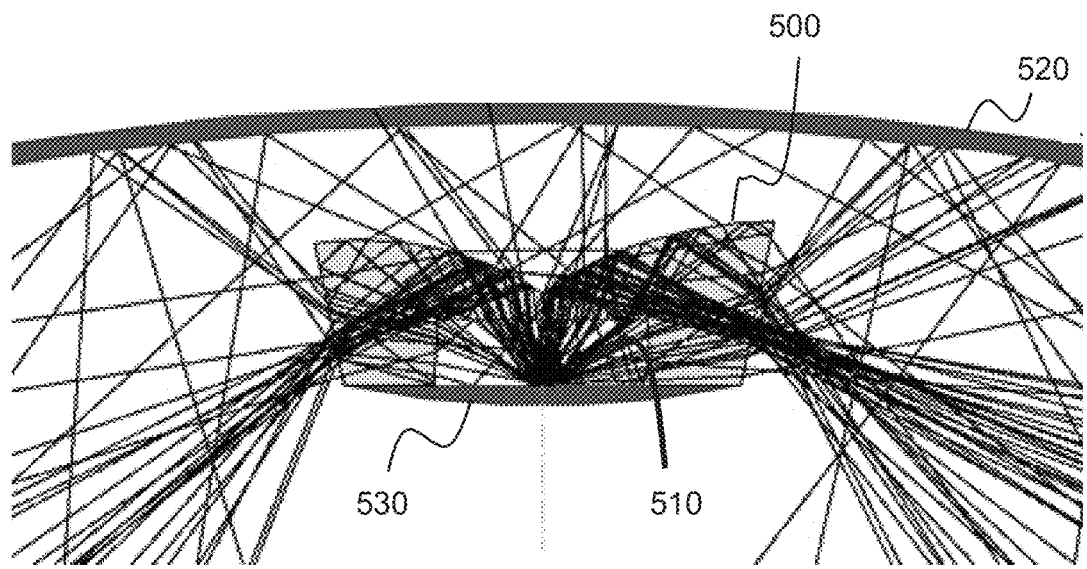
FIG. 5 is an illustration of light from an LED through the first variation asymmetric lens as reflected from an associated reflector and accounting for the effect of a support frame.
Figure 6:
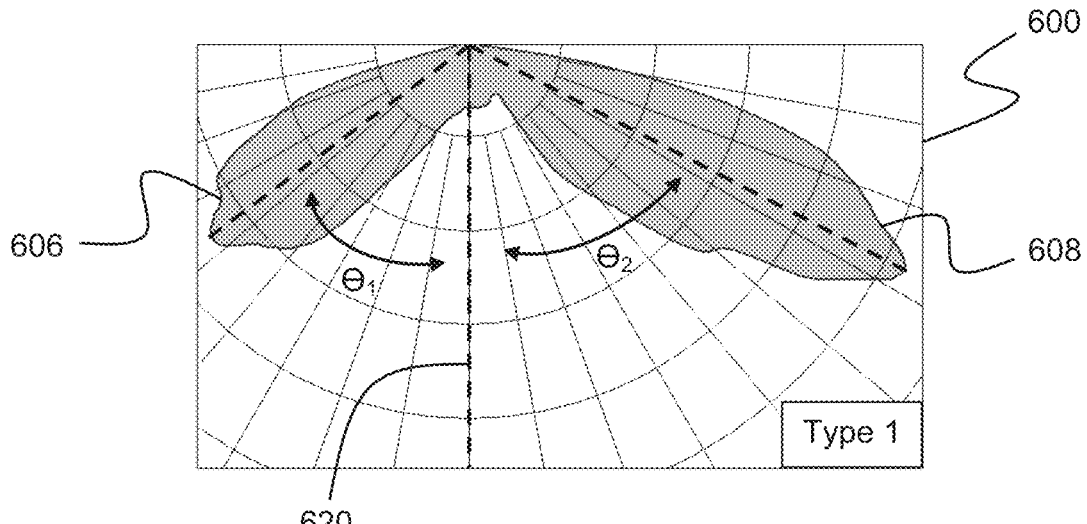
FIG. 6 is a graphical representation of the light distribution from the lens-reflector and a support frame combination in accordance with a first variation asymmetric lens embodiment of the present subject matter.

With reference now to FIGS. 4-6, a second exemplary embodiment of the present subject matter will be described. In this regard, FIG. 4 is an illustration of a first type of an asymmetric lens 400 in accordance with the present subject matter. Although not illustrated with superimposed light rays, support frame and LED as in FIG. 1, it should be appreciated that light paths through and from lens 400 are quite similar to those illustrated in FIG. 1 except that the batwing light distribution is slightly asymmetric based on the asymmetrical shape of lens 400. For example, in the exemplary configuration of lens 400 illustrated in FIG. 4, the difference in peak locations 402, 404 is such that the angular difference between the lobes 606, 608 and reference line 620, i.e., the difference in the angles $\Theta_1$ and $\Theta_2$ is approximately 10°. In other embodiments this difference may range from about 5° to about 30° for added control of light distribution. In this embodiment of the present subject matter it should be appreciated that the asymmetry produced by lens 400, indicated as Type 1 in FIG. 6, involves one lobe 606 of the intensity distribution being centered at a different angle ($\Theta_1$) from the central axis 620 when compared to the other lobe 608 ($\Theta_2$).

With the addition of reflector 520 as illustrated in FIG. 5, light paths from LED 510 through asymmetric lens 500 are formed where some of the light paths are reflected from an associated reflector 520 while others are blocked by support frame 530 and still others are reflected within lens 500 to produce, along with those paths reflected from reflector 520, a batwing distribution of light from the LED 510 in a light direction generally opposite to the initial direction of light from LED 510.

FIG. 6 is a graphical representation 600 of an exemplary batwing light distribution 606, 608 from the lens-reflector and support frame combination illustrated in FIG. 5. As will be apparent from inspection of FIGS. 4-6, lens 400, 500 is asymmetrically formed so as to at least partially skew the batwing distribution 606, 608 to one side (608 in FIG. 6) as a mechanism for controlling light distribution.

Figure 7:
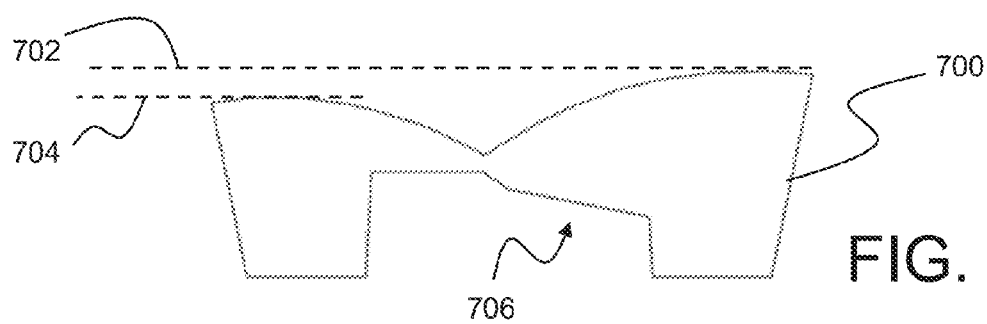
FIG. 7 is an illustration of a second variation of an asymmetric lens in accordance with the present subject matter.
Figure 8:
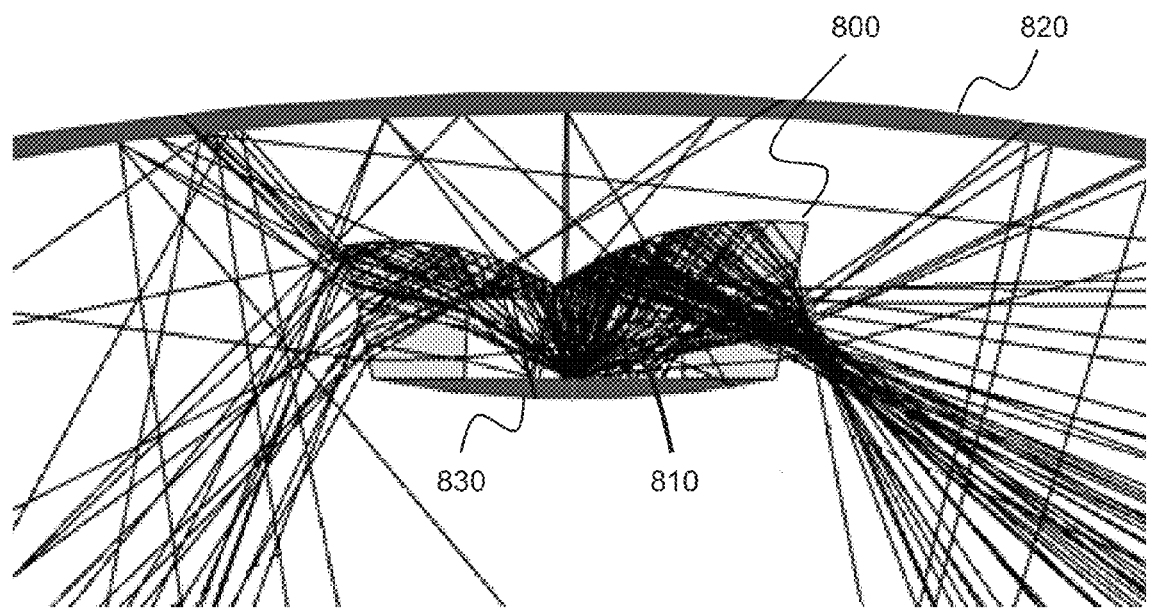
FIG. 8 is an illustration of light from an LED through the second variation asymmetric lens as reflected from an associated reflector and accounting for the effect of a support frame.
Figure 9:
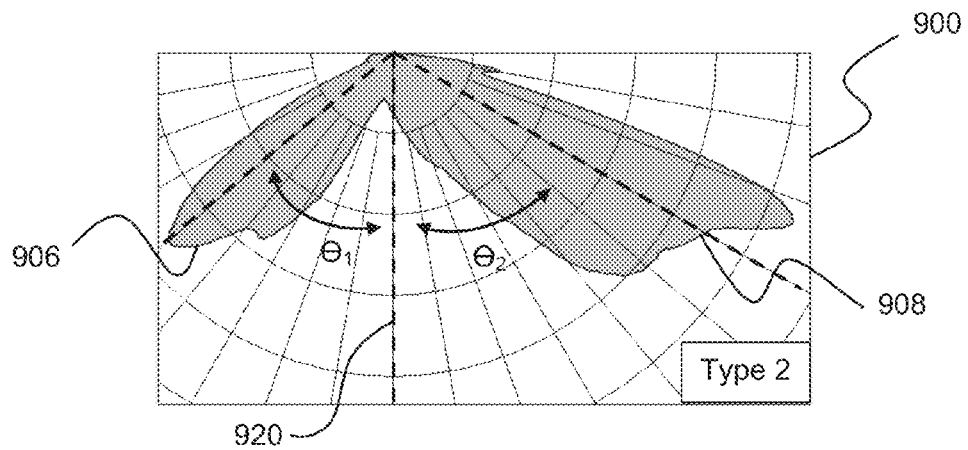
FIG. 9 is a graphical representation of the light distribution from the lens-reflector and a support frame combination in accordance with the second variation asymmetric lens embodiment of the present subject matter.

With reference now to FIGS. 7-8, a third exemplary embodiment of the present subject matter will be described. In this regard, FIG. 7 is an illustration of a second type of an asymmetric lens 700 in accordance with the present subject matter while FIG. 8 illustrates light paths from LED 810 through asymmetric lens 800, some of which being reflected from an associated reflector 820 while others of which are blocked by support frame 830. FIG. 9 is a graphical representation 900 of generally batwing light distribution 906, 908 from the lens-reflector and support frame combination illustrated in FIG. 8.

As will be apparent from inspection of FIGS. 7-9, lens 700, 800 is asymmetrically formed so as to at least partially skew the batwing distribution 906, 908 to one side (908 in FIG. 9) as a mechanism for controlling light distribution. In the exemplary configuration of FIGS. 7-9, the difference in peak locations 702, 704 of lens 700, indicated as Type 2 in FIG. 9, together with the additional asymmetric formation of lens 700 in area 706 provide a configuration where significantly more light flux is directed to the right side 908 despite the fact that the angles $\Theta_1$ and $\Theta_2$ indicating the peaks of the two lobes of the intensity distribution are centered approximately equally on either side of central axis 920 such that the relative ratio of distribution of light between the left side 906 and right side 908 is approximately 30:70. In other embodiments this ratio may range from about 20:80 to 40:60 for added control of light distribution.

Referring to FIG. 10, there is illustrated a linearly elongated extruded lens 1000 embodiment of the present subject matter. As may be seen from a comparison of FIG. 10 with FIG. 4, the cross section as seen at end view 1002 in FIG. 10 of each of these lenses is substantially the same. It should be appreciated that a lens such as lens 100 of FIGS. 1 and 700 of FIG. 7 may also be formed as an extrusion. In this manner a linear array of LEDs may be accommodated with a similar linear reflector having a cross section as illustrated, for example, at 220, 520 and 820, respectively in FIGS. 2, 5 and 8. Of course those of ordinary skill in the art will appreciate that other reflector types, including, for example, parabolic, free-form, and prismatic reflectors, may also be employed together with various lens configurations corresponding to variations of those lenses 400, 700 illustrated in FIGS. 4 and 7. The LED and lens combinations herein disclosed may also be used together with troffers, including many known troffers, as well as street light reflectors.

FIGS. 11A and 11B illustrate a further embodiment of the present subject matter employing an axial symmetric lens wherein the lens cross-section is rotated axially a full 360°. As may best be seen in FIG. 11A, lens 1100, in cross section, is similar to lens 100 of FIG. 1. In this embodiment, lens 1100 may be more particularly suited for use with a single LED or group of LEDs configured in a generally circular or grouped formation.

FIGS. 12A-12D illustrate three-dimensional lens embodiments of the present subject matter where the lens cross-section is rotated through only 180°. As may be seen most readily in FIGS. 12A and 12D, lens 1200 has a generally flat underside 1202 with a recessed area 1204 for at least partially receiving one or more LED light source(s) (not separately illustrated). Further, as best seen in FIGS. 12B and 12C, the upper surfaces 1210, 1212 are formed as generally elliptically shaped bifurcated portions configured to provide variations in light distribution similar to those previously described with reference to FIGS. 1-9. In this regard the two rotated portions of the lenses may be symmetrical or asymmetrically configured in a manner similar to the lenses illustrated in FIGS. 1, 4, and 7 so as to provide symmetric or asymmetric light distribution patterns.

This written description uses examples to disclose the present subject matter, including the best mode, and also to enable any person skilled in the art to practice the subject matter, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A light distribution system, comprising:
a lens comprising a first surface and a second surface; and
an LED light source configured to direct light in an initial direction towards at least the first surface, wherein light directed toward said first surface passes through said lens and is at least partially reflected back from said second surface to produce a batwing light distribution in a light direction generally opposite to the initial direction of light from the LED light source;

the system further comprising:

a reflector positioned opposite said second surface from said LED light source, wherein said lens includes a third surface forming side surfaces between said first and second surfaces through which light may pass and emerge generally in the direction of initial light from said LED light source, wherein at least a portion of the light passing through said lens and emerging from said third surface is reflected by said reflector to provide fill light in a central area of the batwing light distribution produced by said lens.

2. A system as in claim 1, wherein said second surface is bifurcated along a central line into two symmetric portions thereby producing a symmetric batwing light distribution.

3. A system as in claim 1, wherein said second surface is bifurcated along a central line into two asymmetric portions thereby producing an asymmetric batwing light distribution.

4. A system as in claim 3, wherein said two asymmetric portions each has an angle defined from a central axis to a point of peak light intensity wherein the difference between said angles is in the range from about 5° to about 30°.

5. A system as in claim 4, wherein said two asymmetric portions each has an angle defined from a central axis to a point of peak intensity wherein the difference between said angles is about 10°.

6. A system as in claim 1, wherein the second surface is bifurcated along a central line into two asymmetric portions whereby light flux from said LED is directed to a first portion such that the relative ratio of the amount of light between said first portion and a second portion is approximately in a range from about 20:80 to 40:60.

7. A system as in claim 6, wherein the ratio is about 30:70.

8. A system as in claim 1, wherein said lens is axially symmetric.

9. A system as in claim 1, wherein said lens is linearly elongated.

10. A system as in claim 1, wherein said first surface is generally flat and said second surface is bifurcated.

11. A system as in claim 10, wherein the bifurcated surfaces are symmetrical.

12. A system as in claim 10, wherein the bifurcated surfaces are asymmetrical.

13. A system as in claim 10, wherein the first surface includes a recessed area for at least partially receiving said LED light source.

14. A method for producing a batwing distribution of light, comprising:

illuminating with a source of light in an initial light direction a lens having a first surface and a second surface such that a portion of the illuminating light strikes the first surface and is internally reflected within the lens from the second surface in a direction generally opposite to the initial light direction of the source of light;

wherein said lens includes a third surface forming side surfaces between said first and second surfaces through which light may pass and emerge generally in the direction of initial light from said LED light source, the method further comprising:

reflecting at least a portion of the illuminating light passing through the third surface from a reflector positioned opposite said second surface from said LED light source, in a direction generally opposite to the initial light direction.

15. A method as in claim 14 wherein said second surface is bifurcated along a central line into two symmetric portions thereby producing a symmetric batwing light distribution.

16. A method as in claim 14 wherein said second surface is bifurcated along a central line into two asymmetric portions thereby producing an asymmetric batwing light distribution.

17. A method as in claim 16 wherein the two asymmetric portions each has an angle defined from a central axis to a point of peak intensity wherein the difference between said angles is in the range from about 5° to about 30°.

18. A method as in claim 16, wherein the two asymmetric portions distribute light between the first portion and the second portion in a ratio range from about 20:80 to 40:60.

* * * * *